UNITED STATES PATENT OFFICE.

JEAN M. O. TAMIN, OF NEW YORK, N. Y.

IMPROVEMENT IN PURIFYING SUGAR, MOLASSES, AND SACCHARINE JUICES.

Specification forming part of Letters Patent No. 141,831, dated August 12, 1873; application filed June 16, 1873.

*To all whom it may concern:*

Be it known that I, JEAN MARIE ONESIME TAMIN, of the city, county, and State of New York, have invented an Improved Process of Purifying Sugar, of which the following is a specification:

This invention relates to a new process for purifying sugar, molasses, and saccharine juices of all kinds; and consists in the use for that purpose of soluble metallic silicofluorides alone, or mixed in variable proportions, according to the composition of the sugar or juice to be treated.

My invention is intended to some extent as an improvement on the invention for which T. E. O. Allaire obtained Letters Patent No. 127,447, on the 4th day of June, 1872, and which is based upon the employment of silicofluorides having volatile bases, while I use the simple metallic silicofluorides—such as, for example, the silicofluorides of calcium, of lead, of aluminum, nickel, manganese, magnesium, and others.

In carrying out my invention I proceed substantially as follows: After having determined the quantity and sort of salty matter contained in the sugar or juices to be treated it is necessary to assign for treatment a proportionate quantity of the silicofluoride to be used, which is then added to the sugar or juices in order to separate by precipitation more or less or all the salts therein contained. The best moment for adding the silicofluoride is generally directly after the fusion of the sugar in the refinery, or after defecation in the manufactory, so that the process may be carried on without increasing the temperature usually employed in these two common operations. After the sugar or juice has been about ten minutes commingled with the silicofluoride, and if it is found that neutralization is not fully attained, I may add either a suitable oxide of metal united with silicofluorine, oxide of lead, of calcium, &c., or I may add sulphates or phosphates of lead or of calcium, &c., or carbonates or very soluble sulphates or phosphates, such as those of potassia or manganates. After the sugar or juice under treatment has been properly neutralized it is conveyed, before or after decantation, toward the bag-filter. When filtration is completed the subsequent treatment of the sugar is the same as usual. The residuum decantation at the bottom of the vessel, or of the filtration on the filter, is washed, pressed, and more or less dried, and then mixed with the carbonates, phosphates or sulphates, alkaline or acid of potassia, or other substance, about half a pound of salt being used for two pounds of the resdiuum. The exact proportions are calculated by the equivalents after analyzing. The residuum is of course as variable as the composition of the sugar itself. It is, when obtained, heated in a furnace, to be sublimated, so carefully, however, that the sublimated body will be a part of the silicofluoride used. The final residuum of the sublimate remaining in the furnace may be mixed with ammoniacal waters, or sulphates or phosphates of lime, or other substances, in order to compose an excellent manure.

When the silicofluoride which has been chosen for the purpose of purification cannot be sublimated—as, for example, that of calcium—the whole residuum is treated by sulphuric acid, of which about one pound is used for two pounds of the residuum, the mixture being slightly heated, whereupon fluoride of silicium is disengaged, mixed in lime-water, provided silicofluoride of calcium has been used. The lime-water is afterward saturated with carbonate of lime, and the residuum is treated as above for manure, &c.

When it is desired to avoid any degeneration the whole residuum of filtration or decantation is washed and pressed, and mixed, or not, as may be desired, with ammoniacal waters, such as that obtained from gas, &c., and with sulphates or phosphates, and finally sold as manure. The more ammoniacal water or other substances there is added, the richer will the manure be in azotes and phosphates.

In order to make every kind of primitive silicofluoride into a state of solid salt the following means will be found the simplest: that is to say, dissolve the carbonate of metal chosen until saturation, (which is calculated of course by equivalents in hydrofluosilicic acid,) and then allow slowly to evaporate.

What I claim as my invention is—

1. The process of purifying sugar, molasses, and saccharine juices by the use of soluble metallic silicofluorides, substantially as herein described.

2. The process of regenerating the primitive metallic silicofluoride used in the purification of sugar or saccharine juices, as set forth.

3. The combination of the ammoniacal water, sulphates, or phosphates with the residuum of regeneration or of filtration of the purifying process, for the purpose of producing a manure, as set forth.

DR. J. M. O. TAMIN.

Witnesses:
   A. V. BRIESEN,
   F. V. BRIESEN.